US012112860B2

(12) United States Patent
Kobayashi

(10) Patent No.: US 12,112,860 B2
(45) Date of Patent: Oct. 8, 2024

(54) SHIELDED TWISTED PAIR CABLE

(71) Applicant: SUMITOMO ELECTRIC INDUSTRIES, LTD., Osaka (JP)

(72) Inventor: Yuto Kobayashi, Tochigi (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 105 days.

(21) Appl. No.: 18/183,348

(22) Filed: Mar. 14, 2023

(65) Prior Publication Data

US 2023/0307156 A1 Sep. 28, 2023

(30) Foreign Application Priority Data

Mar. 23, 2022 (JP) ................................ 2022-047126

(51) Int. Cl.
*H01B 11/00* (2006.01)
*H01B 11/10* (2006.01)

(52) U.S. Cl.
CPC ......... *H01B 11/1033* (2013.01); *H01B 11/10* (2013.01); *H01B 11/1008* (2013.01); *H01B 11/1025* (2013.01)

(58) Field of Classification Search
CPC . H01B 11/1033; H01B 11/10; H01B 11/1008; H01B 11/1025
See application file for complete search history.

(56) References Cited

U.S. PATENT DOCUMENTS 7,544,894 B2 * 6/2009 Victor ................ H01B 11/1821 174/113 R
2003/0024728 A1 * 2/2003 Yamamoto ........... H01B 11/203 174/113 R
2010/0307785 A1 * 12/2010 Kolasa .................. H01B 11/00 174/36

FOREIGN PATENT DOCUMENTS

WO 2019/058437 3/2019

* cited by examiner

*Primary Examiner* — Pete T Lee
(74) *Attorney, Agent, or Firm* — IPUSA, PLLC

(57) ABSTRACT

A shielded twisted pair cable includes a twisted pair wire including two insulated wires that are twisted together, and a shield configured to cover the twisted pair wire. Each of the two insulated wires includes a conductor, and an insulator covering the conductor. The shield includes a first shield, a second shield, and a third shield in this order from a position closest to the twisted pair wire. The first shield includes a first resin tape with a metal foil, spirally wound around the twisted pair wire, the second shield includes a braided conductor, and the third shield includes a second resin tape with a metal foil. The metal foil of the first resin tape with the metal foil makes contact with the braided conductor, and the braided conductor makes contact with the metal foil of the second resin tape with the metal foil.

4 Claims, 9 Drawing Sheets

SHIELDED TWISTED PAIR CABLE

CROSS-REFERENCE TO RELATED APPLICATIONS

This application is based upon and claims priority to Japanese Patent Application No. 2022-047126, filed on Mar. 23, 2022, the entire contents of which are incorporated herein by reference.

TECHNICAL FIELD

The present disclosure relates to shielded twisted pair cables.

BACKGROUND

For example, International Publication Pamphlet No. WO 2019/058437 proposes a shielded communication cable having a twisted pair wire. The twisted pair wire includes a pair of insulated wires twisted together, a braided shield, and a shield film having a metal film. The insulated wire includes conductors, and an insulating cover covering outer peripheries of the conductors. The shield film is laminated on the braided shield, and the braided shield directly covers an outer periphery of the twisted pair wire.

In recent years, there are demands to use a twisted pair cable capable of making high-speed communication, that is, capable of transmitting signals in high-frequency ranges, for cables used in automobiles or the like. In order to transmit the signals in the high-frequency ranges, excellent noise shielding properties are required of the twisted pair cable.

SUMMARY

According to one aspect of the embodiments, a shielded twisted pair cable includes a twisted pair wire including two insulated wires that are twisted together; and a shield configured to cover the twisted pair wire, wherein each of the two insulated wires includes a conductor, and an insulator covering the conductor, the shield includes a first shield, a second shield, and a third shield in this order from a position closest to the twisted pair wire, the first shield includes a first resin tape with a metal foil, spirally wound around the twisted pair wire, the second shield includes a braided conductor, the third shield includes a second resin tape with a metal foil, and the metal foil of the first resin tape with the metal foil makes contact with the braided conductor, and the braided conductor makes contact with the metal foil of the second resin tape with the metal foil.

The object and advantages of the embodiments will be realized and attained by means of the elements and combinations particularly pointed out in the claims.

It is to be understood that both the foregoing general description and the following detailed description are exemplary and explanatory and not restrictive of the invention, as claimed.

DETAILED DESCRIPTION

Figure 1:
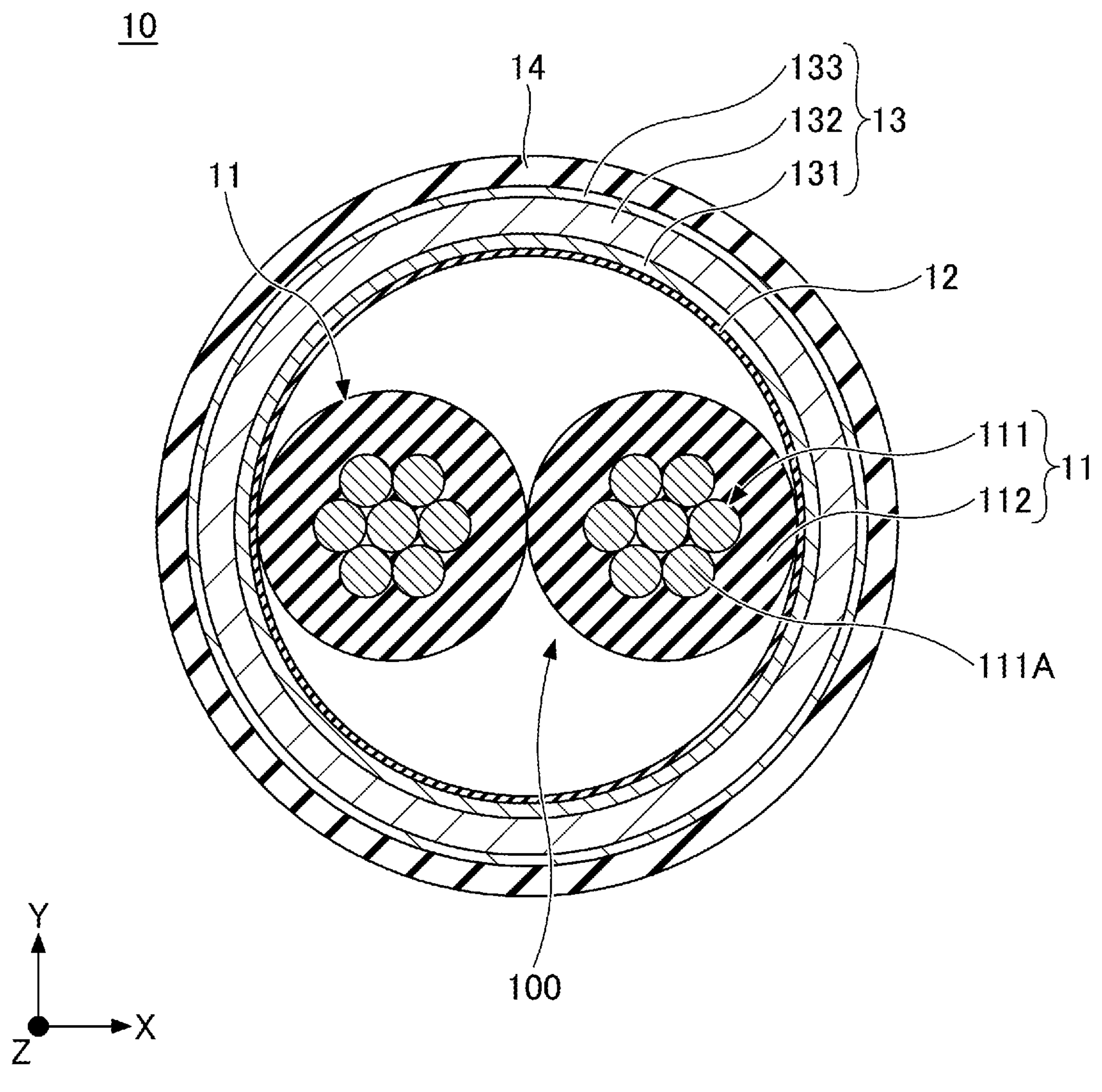
FIG. 1 is a cross sectional view illustrating a shielded twisted pair cable according to one embodiment of the present disclosure, along a plane perpendicular to a longitudinal direction of the shielded twisted pair cable.

A description will hereinafter be given of embodiments of the present disclosure with reference to the drawings.

One object of the embodiments of the present disclosure is to provide a shielded twisted pair cable having excellent noise shielding properties.

Description of Embodiments of Present Disclosure

The embodiments of the present disclosure will first be described with reference to the drawings. In the following description, the same or corresponding elements are designated by the same reference numeral, and a repeated description of the same or corresponding elements will be omitted.

[1] A shielded twisted pair cable according to one aspect of the present disclosure includes a twisted pair wire including two insulated wires that are twisted together; and a shield configured to cover the twisted pair wire, wherein each of the two insulated wires includes a conductor, and an insulator covering the conductor, the shield includes a first shield, a second shield, and a third shield in this order from a position closest to the twisted pair wire, the first shield includes a first resin tape with a metal foil, spirally wound around the twisted pair wire, the second shield includes a braided conductor, the third shield includes a second resin tape with a metal foil, and the metal foil of the first resin tape with the metal foil makes contact with the braided conductor, and the braided conductor makes contact with the metal foil of the second resin tape with the metal foil.

By spirally winding the first resin tape with the metal foil around the twisted pair wire so as to form the first shield, it is possible to secure basic characteristics required of wires transmitting signals in the high-frequency range, such as reducing insertion loss or the like, with respect to the shielded twisted pair cable.

Because a braided configuration has an excellent mechanical strength, when the second shield has the braided conductor, it is possible to improve a durability of the shielded twisted pair cable while improving noise shielding properties.

By using the shield in which the first shield, the second shield, and the third shield are combined, it is possible to improve electric characteristics of the shielded twisted pair cable, and improve the noise shielding properties. For this reason, the shielded twisted pair cable is particularly suitable for use in communication in the high-frequency range.

In addition, because the shielded twisted pair cable includes the third shield, it is possible to improve the noise shielding properties of the shielded twisted pair cable, even in a case where the braid density of the second shield is low. In this case, because the braid density of the second shield is low, it is possible to make the shielded twisted pair cable lightweight and soft or flexible, and easy to handle.

[2] The second resin tape with the metal foil may be disposed in a longitudinal lapping arrangement.

By the longitudinal lapping arrangement of the second resin tape with the metal foil included in the third shield, a current flowing through the third shield can be caused to flow along a longitudinal direction of the shielded twisted pair cable, to particularly improve the noise shielding properties of the shielded twisted pair cable. For this reason, even in a case where the braid density of the second shield is low, it is possible to sufficiently improve the noise shielding properties. In this case, because the braid density of the second shield is low, it is possible to make the shielded twisted pair cable lightweight and easy to handle.

[3] A braid density of the braided conductor may be greater than or equal to 40%.

By setting the braid density of the braided conductor greater than or equal to 40%, it is possible to particularly improve the noise shielding properties of the shielded twisted pair cable.

Details of Embodiments of Present Disclosure

Specific examples of the shielded twisted pair cable according to embodiments of the present disclosure will be described below, with reference to the drawings. The present invention is not limited to the described embodiments, and various variations, modifications, and substitutions may be made within the scope of the present invention and equivalents thereof. In the following description, each embodiment being described may be referred to as "the present embodiment".

[Shielded Twisted Pair Cable]

FIG. 1 is a cross sectional view of a shielded twisted pair cable 10 according to the present embodiment, along a plane perpendicular to a longitudinal direction of the shielded twisted pair cable 10. In FIG. 1, a Z-axis perpendicular to the paper surface is an axis parallel to the longitudinal direction of the shielded twisted pair cable 10 and a twisted pair wire 100. An XY-plane formed by an X-axis and a Y-axis is a cross section perpendicular to the longitudinal direction of the shielded twisted pair cable 10 and the twisted pair wire 100. The same applies to FIG. 3 and FIG. 5 which will be described later.

As illustrated in FIG. 1, the shielded twisted pair cable 10 according to the present embodiment includes the twisted pair wire 100 having two insulated wires 11 that are twisted together, and a shield 13 covering the twisted pair wire 100. Each member included in the shielded twisted pair cable 10 according to the present embodiment will be described below.

(1) Twisted Pair Wire 100:

The twisted pair wire 100 can be formed by twisting the two insulated wires 11 together. As illustrated in FIG. 1, each of the two insulated wires 11 includes a conductor 111, and an insulator 112 covering an outer side of the conductor 111.

(1-1) Insulated Wire:

(1-1-1) Conductor:

A material used for the conductor 111 is not particularly limited. One or more kinds of conductive materials selected from copper alloys, copper, tin-plated annealed copper, or the like, for example, may be used for the conductor 111. Annealed copper may be suitably used as the copper. In order to adjust an elongation or the like of the conductor 111, for example, an anneal process may be performed.

The conductor 111 may be a solid wire (or single wire) or a stranded wire. From a viewpoint of increasing flexibility of the insulated wire 11, or the shielded twisted pair cable 10 including the insulated wire 11, the conductor 111 is preferably a stranded wire including a plurality of conductor element wires 111A that are twisted together.

(1-1-2) Insulator:

A material used for the insulator 112 is not particularly limited, and can be selected according to characteristics or the like required of the shielded twisted pair cable 10.

The insulator 112 may include a resin, for example, and the resin is not particularly limited. For example, one or more resins selected from fluororesins, such as polytetrafluoroethylene (PTFE), tetrafluoroethylene-perfluoroalkylvinyl ether copolymer (PFA), tetrafluoroethylene-hexafluoropropylene copolymer (FEP), ethylene-tetrafluoroethylene copolymer (ETFE), or the like, polyester resins, such as polyethylene terephthalate (PET) or the like, and polyolefin resins, such as polyethylene, polypropylene, or the like, can be used as the resin. The resin is particularly preferably polypropylene. The resin of the insulator 112 may or may not be cross linked.

The insulator 112 may include an additive, such as a flame retardant, a flame retardant assistant, an antioxidant, a lubricant, a coloring agent, a reflection imparting agent, a masking agent, a processing stabilizer, a plasticizer, or the like, in addition to the resin.

(1-2) Twisted Configuration of Twisted Pair Wire:

The twisted pair wire 100 can be formed by twisting two insulated wires 11 together. A twist pitch of a twisted configuration of the twisted pair wire 100 is not particularly limited, and can be set according to an outer diameter of the insulated wire 11 or the like.

The twist pitch is preferably less than or equal to 30 mm, and more preferably less than or equal to 20 mm, for example. By setting the twist pitch of the twisted pair wire 100 to less than or equal to 30 mm, it is possible to reduce looseness of the twisted configuration of the twisted pair wire 100, and obtain stable transmission characteristics.

A lower limit value of the twist pitch is not particularly limited, and can be greater than or equal to 5 mm, for example.

The twist pitch of the twisted pair wire 100 is preferably less than or equal to 24 times an outer diameter of the insulated wire 11, and more preferably less than or equal to 16 times the outer diameter of the insulated wire 11.

By setting the twist pitch of the twisted pair wire 100 to less than or equal to 24 times the outer diameter of the insulated wire 11, it is possible to reduce the looseness of the twisted configuration, reduce an increase in a characteristic impedance or the like caused by the looseness of the twisted configuration, and obtain stable transmission characteristics.

(2) Shield:

The shielded twisted pair cable 10 according to the present embodiment can have a shield 13 that covers the twisted pair wire 100.

The shield 13 may include a first shield 131, a second shield 132, and a third shield 133 in this order from a position closest to the twisted pair wire 100.

Hereinafter, the first shield 131, the second shield 132, and the third shield 133 of the shield 13 will be described.

(2-1) First Shield:

The first shield 131 may have a first resin tape with a metal foil, spirally wound around the twisted pair wire 100.

Figure 2:
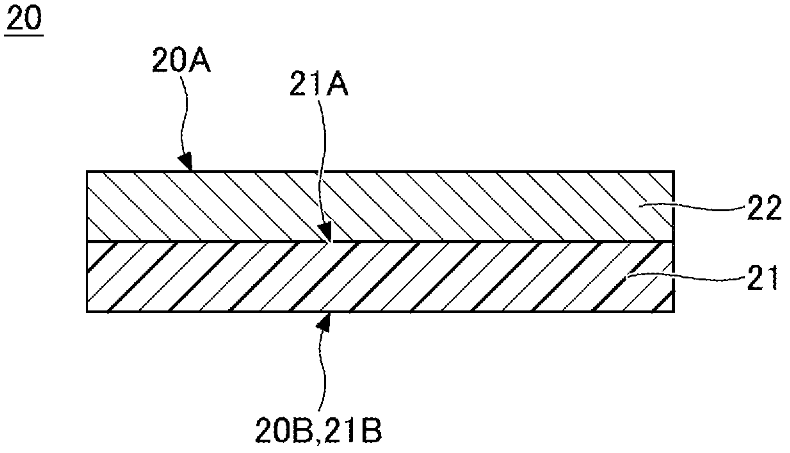
FIG. 2 is a cross sectional view of a resin tape with a metal foil, along a plane in a laminating direction of a resin layer and the metal foil.

A first resin tape with the metal foil, that can be used as the resin tape with the metal foil, will be described with reference to FIG. 2. FIG. 2 is a cross sectional view schematically illustrating a resin tape 20 with a metal foil, along a plane in a laminating direction of a resin layer 21 and a metal foil 22. As illustrated in FIG. 2, the resin tape 20 with the metal foil has a configuration in which the resin layer 21 and the metal foil 22 are laminated. That is, the resin tape 20 with the metal foil has a configuration including the resin layer 21, and the metal foil 22 that is disposed at least on an upper surface 21A of the resin layer 21. In the resin tape 20 with the metal foil, the metal foil 22 may be disposed on both the upper surface 21A and a lower surface 21B of the resin layer 21.

Examples of a resin included in the resin layer 21 include one or more kinds of resins selected from polyester resins, such as polyethylene terephthalate (PET) or the like, polyolefin resins, such as polypropylene (PP) or the like, and vinyl resins, such as polyvinyl chloride (PVC) or the like, for example. The resin layer 21 may include an additive or the like, in addition to the various kinds of resins.

A thickness of the resin layer 21 is not particularly limited, but is preferably greater than or equal to 10 μm, for example. By setting the thickness of the resin layer 21 greater than or equal to 10 μm, it is possible to improve a mechanical strength and handleability of the resin tape 20 with the metal foil.

In addition, the thickness of the resin layer 21 is preferably less than or equal to 500 μm. By setting the thickness of the resin layer 21 less than or equal to 500 μm, it is possible to easily wind the resin tape 20 with the metal foil around the twisted pair wire 100, and stabilize a shape of the shielded twisted pair cable 10.

A material used for the metal foil 22 is not particularly limited. Examples of the material used for the metal foil 22 include one or more kinds of metal materials selected from copper, copper alloys, aluminum, aluminum alloys, or the like, for example. The metal foil 22 may be formed of a single metal foil made of a single kind of metal material, or may be formed of a laminate of a plurality of metal foils made of two or more kinds of metal materials. In addition, a material other than a metal, such as a protective film including an organic material, may be disposed on a surface of the metal foil within a range that does not deteriorate the noise shielding characteristics of the shielded twisted pair cable 10.

A thickness of the metal foil 22 is not particularly limited, but is preferably in a range greater than or equal to 1 μm and less than or equal to 30 μm. By setting the thickness of the metal foil 22 greater than or equal to 1 μm, it is possible to particularly improve the noise shielding properties. Further, by setting the thickness of the metal foil 22 less than or equal to 30 μm it is possible to improve the flexibility of the resin tape with the metal foil.

In the first shield 131 of the shielded twisted pair cable 10 according to the present embodiment, a first surface 20A having the metal foil 22 of the resin tape 20 with the metal foil disposed thereon, is preferably disposed on an outer side, that is, so as to oppose the second shield 132 which will be described later.

Accordingly, in the first shield 131, a second surface 20B having the resin layer 21 of the resin tape 20 with the metal foil disposed thereon, can be disposed so as to oppose the twisted pair wire 100.

An adhesive layer may be disposed on the resin tape 20 with the metal foil, that is, on the second surface 20B, so as to oppose the twisted pair wire 100. By disposing the adhesive layer, it is possible to adhere the resin tape 20 with metal foil with respect to the twisted pair wire 100, and stabilize the shape of the shielded twisted pair cable 10.

Figure 3:
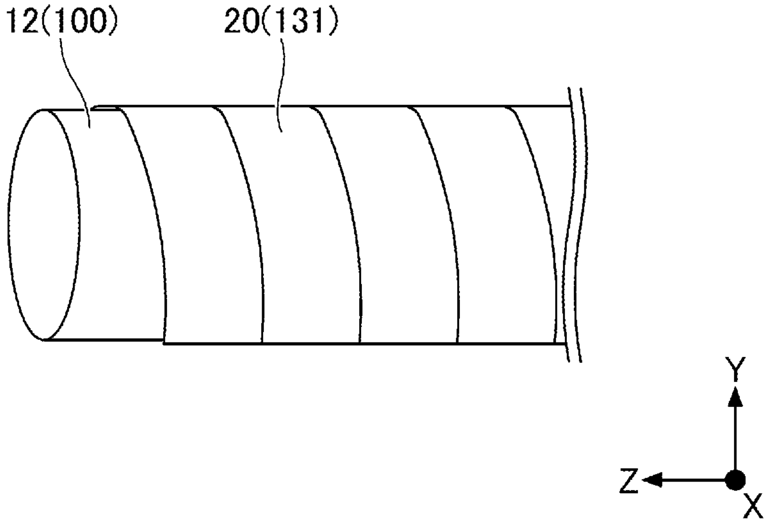
FIG. 3 is a diagram for explaining a first resin tape with a metal foil, spirally wound around the twisted pair cable.

As illustrated in FIG. 3, the resin tape 20 with the metal foil, which is an example of a first resin tape with a metal foil, can be spirally wound along the longitudinal direction of the twisted pair wire 100 to form the first shield 131. In FIG. 3, the illustration of cross sectional configurations of the twisted pair wire 100 and a wrapping tape 12 that are originally visible at an end portion of the twisted pair wire 100 and a vicinity of the end portion, is omitted for the sake of convenience. In addition, FIG. 3 illustrates a state where a portion of the first shield 131 is removed to expose the wrapping tape 12 at a side surface, so as to clarify the arrangement of the members. The first shield 131 can be disposed on the outer side the twisted pair wire 100, so as to cover an outer surface of the twisted pair wire 100. In a case where the wrapping tape 12, which will be described later, is disposed on the outer surface of the twisted pair wire 100, the first shield 131 is disposed so as to cover an outer surface of the wrapping tape 12, as illustrated in FIG. 3.

The wrapping tape 12 is provided in the example described above, however, the wrapping tape 12 may be omitted.

When winding the first resin tape with the metal foil around the twisted pair wire 100, portions of the first resin tape with the metal foil, adjacent to each other along the longitudinal direction of the twisted pair wire 100, preferably overlap so as to completely cover the outer surface of the twisted pair wire 100.

By spirally winding the first resin tape with the metal foil around the twisted pair wire 100 so as to form the first shield 131, it is possible to secure basic characteristics required of wires transmitting signals in the high-frequency range, such as reducing insertion loss or the like, with respect to the shielded twisted pair cable 10.

(2-2) Second Shield:

The second shield 132 may have a braided conductor.

Figure 4:
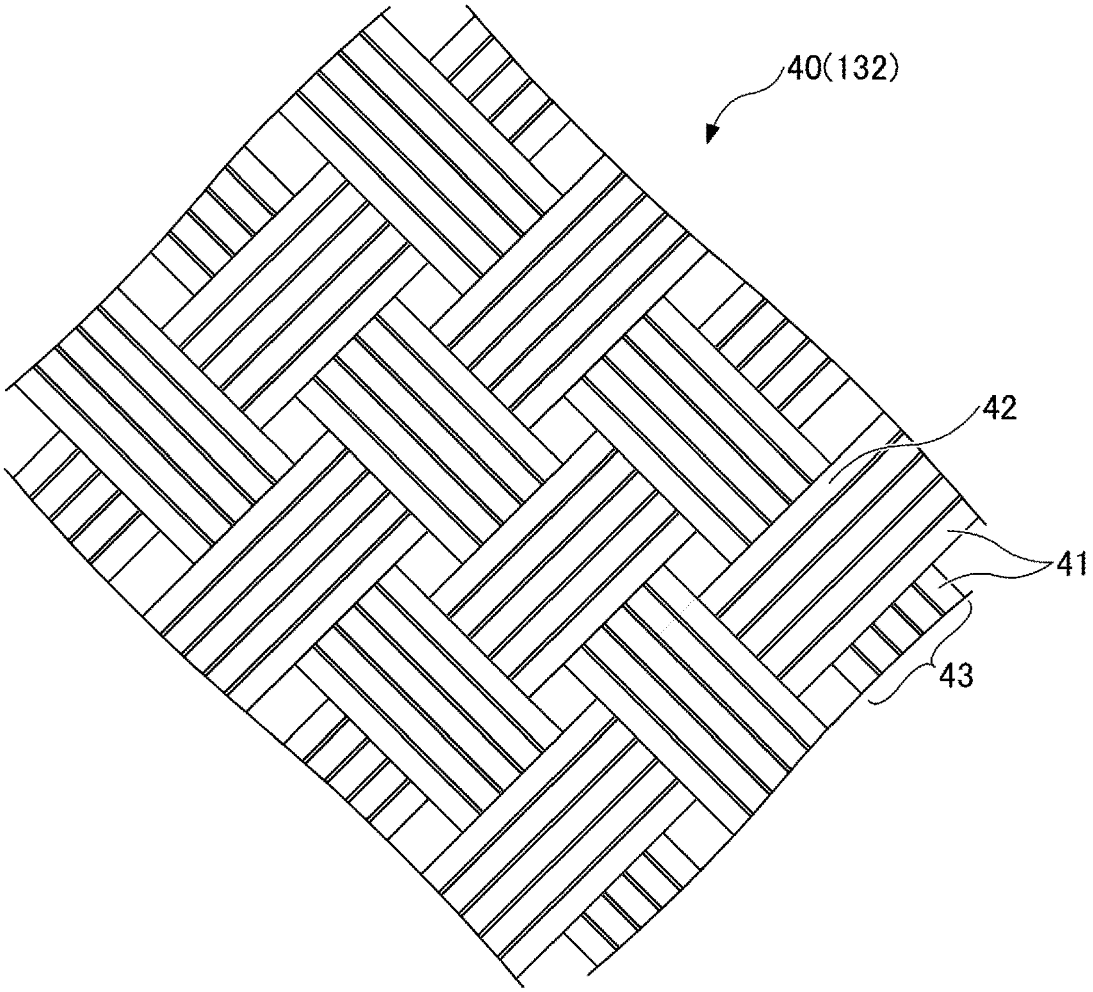
FIG. 4 is a diagram for explaining a braided conductor.

As illustrated in FIG. 4, a braided conductor 40 of the second shield 132 may have a braided configuration in which metal element wires (or strands) 41 are braided to form a hollow cylindrical shape. Because the braided configuration has an excellent mechanical strength, when the second shield 132 has the braided conductor 40, it is possible to improve a durability of the shielded twisted pair cable 10 while improving the noise shielding properties.

FIG. 4 is an enlarged view of a portion of the braided conductor 40 that forms the second shield 132. As illustrated in FIG. 4, the braided conductor 40 can have a configuration in which units 43, each formed by a plurality of metal element wires 41, are braided so as to intersect with one another, and a braid (or overlap) 42 is formed at each intersection. A number of units 43, each formed by the plurality of metal element wires 41, included in the braided conductor 40, may also be referred to as "a number of units" or the like. A number of metal element wires 41 included in each unit 43 may also be referred to as "a number of strands" or the like.

A material used for the metal element wires 41 of the braided conductor 40 included in the second shield 132 is not particularly limited. Examples of the material used for the metal element wires 41 include metal materials, such as copper, copper alloys, aluminum, aluminum alloys, and metal materials having surfaces thereof that are plated, such as a tin-plated annealed copper, for example. Annealed copper may be suitably used as the copper.

The configuration of the braided conductor 40 included in the second shield 132 is not particularly limited. The braided conductor 40 included in the second shield 132 preferably has a braid density greater than or equal to 40%, more preferably greater than or equal to 50%, and still more preferably greater than or equal to 60%.

The braid density refers to a ratio of an area occupied by the metal element wires 41 in a unit area of the braided conductor 40. For this reason, the braid density can be computed according to the following procedure, for example.

The braided conductor 40 is captured or imaged by an imaging means, such as a camera or the like, so that the captured image includes a square evaluation area having one side with a length corresponding to one-half of a wire width. The wire width refers to an outer diameter of the twisted pair wire 100. The captured image is subjected to a binarization process to compute an area (A) of a metal element wire portion occupying the evaluation area. Then, the braid density can be computed from the area (A) and an area (B) of the evaluation area, according to the following formula (1).

$$\text{Braid density (\%)} = A \div B \times 100 \quad (1)$$

By setting the braid density of the braided conductor 40 greater than or equal to 40%, it is possible to particularly improve the noise shielding properties of the shielded twisted pair cable 10.

An upper limit of the braid density is not particularly limited, but the braid density is preferably less than or equal to 95%, and more preferably less than or equal to 90%.

By setting the braid density less than or equal to 95%, it is possible to reduce a manufacturing cost of the second shield 132, and increase productivities of the second shield 132 and the shielded twisted pair cable 10.

(2-3) Third Shield:

The third shield 133 may include a second resin tape with a metal foil.

By using the shield 13 in which the first shield 131, the second shield 132, and the third shield 133 are combined, it is possible to improve electric characteristics of the shielded twisted pair cable 10, and improve the noise shielding properties. For this reason, the shielded twisted pair cable 10 is particularly suitable for use in communication in the high-frequency range.

The resin tape 20 with the metal foil, which is an example of the second resin tape with the metal foil, may have the same configuration as the first resin tape with the metal foil described above, and thus, a description thereof will be omitted.

The first resin tape with the metal foil included in the first shield 131, and the second resin tape with the metal foil included in the third shield 133, may have the same configuration or may have different configurations.

Because the shielded twisted pair cable 10 according to the present embodiment includes the third shield 133, it is possible to improve the noise shielding properties of the shielded twisted pair cable 10, even in a case where the braid density of the second shield 132 is low. In this case, because the braid density of the second shield is low, it is possible to make the shielded twisted pair cable 10 lightweight and soft or flexible, and easy to handle.

The outer periphery of second shield 132 is preferably covered by the second resin tape with the metal foil without a gap, but a manner in which the second resin tape with the metal foil is wound around the second shield 132 is not particularly limited.

Figure 5:
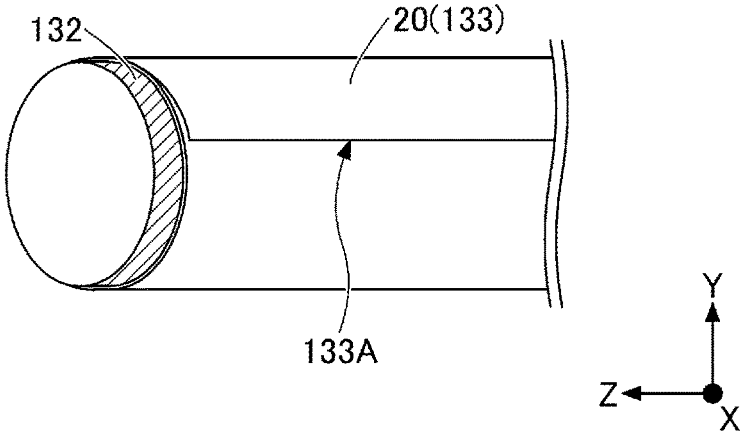
FIG. 5 is a diagram for explaining a second resin tape with a metal foil, longitudinally lapped around a second shield.

The second resin tape with the metal foil, included in the third shield 133, is longitudinally lapped, that is, disposed in a longitudinal lapping arrangement, for example. As illustrated in FIG. 5, the longitudinal lapping refers to an arrangement in which an end portion 133A of the third shield 133 parallel to the longitudinal direction of the resin tape 20 with the metal foil is arranged along a center line of the twisted pair wire 100, and the resin tape 20 with the metal foil is wound around the outer periphery of the twisted pair wire 100 along the longitudinal direction thereof. By winding the second resin tape with the metal foil so as to wrap the outer periphery of the twisted pair wire 100 by the surface of the second resin tape with the metal foil, it is possible to completely cover the twisted pair wire 100, more particularly, the outer surface of the second shield 132 without a gap.

In FIG. 5, the illustration of cross sectional configurations of the twisted pair wire 100, the wrapping tape 12, the first shield 131, and the second shield 132 that are originally visible at the end portion of the twisted pair wire 100 and a vicinity of the end portion, is omitted for the sake of convenience. In addition, FIG. 5 illustrates a state where a portion of the third shield 133 is removed to expose the second shield 132 at a side surface, so as to clarify the arrangement of the members.

The wrapping tape 12 is provided in the example described above, however, the wrapping tape 12 may be omitted.

By the longitudinal lapping arrangement of the second resin tape with the metal foil included in the third shield 133, a current flowing through the third shield 133 can be caused to flow along the longitudinal direction of the shielded twisted pair cable 10, to particularly improve the noise shielding properties of the shielded twisted pair cable 10. For this reason, even in a case where the braid density of the second shield 132 is low, it is possible to sufficiently improve the noise shielding properties. In this case, because the braid density of the second shield 132 is low, it is possible to make the shielded twisted pair cable 10 lightweight and easy to handle.

According to studies conducted by the present inventor, the insertion loss can be made small in a case where "the first resin tape with the metal foil included in the first shield 131 is spirally wound, and the second resin tape with the metal foil included in the third shield 133 is longitudinally lapped" compared to a case where "the first resin tape with the metal foil included in the first shield 131 is longitudinally lapped, and the second resin tape with the metal foil included in the third shield 133 is spirally wound".

For this reason, it was confirmed that the above described combination of the layers forming the shield 13 is preferable from a viewpoint of improving the electric characteristics of the shielded twisted pair cable 10.

(2-4) Others:

The metal foil of the first resin tape with metal foil included in the first shield 131 in the shield 13, preferably makes contact with the braided conductor 40 of the second shield 132. Further, the braided conductor 40 of the second shield 132 preferably makes contact with the metal foil of the second resin tape with the metal foil included in the third shield 133. That is, it is preferable that the metal foil of the first shield 131, the braided conductor 40 of the second shield 132, and the metal foil of the third shield 133 are electrically connected to one another. Because the metal foil of the first shield 131, the braided conductor 40 of the second shield 132, and the metal foil of the third shield 133 are electrically connected to one another as described above, it is possible to improve the noise shielding properties.

(3) Outer Sheath:

An outer sheath 14 may be an arbitrarily provided member. However, in a case where the shielded twisted pair cable 10 is provided with the outer sheath 14, it is possible to physically protect the shield 13 and the twisted pair wire 100. More particularly, in a case where the shielded twisted pair cable 10 according to the present embodiment is used in an automobile, avoiding undesirable effects of moisture or water, that is, protection from moisture or water, is required of the shielded twisted pair cable 10. The outer sheath 14 also has a function to prevent the shield 13 and the twisted pair wire 100 from making contact with water, so as to prevent various properties and characteristics of the shielded twisted pair cable 10, such as the characteristic impedance or the like, from being affected by the water.

The outer sheath 14 may include an insulating material. The insulating material included in the outer sheath 14 may include a resin. Examples of the resin include one or more kinds of resins selected from polyolefins, such as polyethylene, polypropylene, or the like, polyvinyl chloride, polystyrene, polytetrafluoroethylene, polyphenylene sulfide, or the like, for example. Moreover, the outer sheath 14 may include, in addition to the resin, an additive, such as a flame retardant or the like, as appropriate.

From a viewpoint of reducing a dielectric constant of the outer sheath 14, in particular, from a viewpoint of avoiding an excessive increase in the dielectric constant even when exposed to a high temperature in an in-vehicle environment or the like, the resin included in the outer sheath 14 preferably has a low molecular polarity. For example, among the resin materials described above, it is preferable to use polyolefin, such as polypropylene or the like, which is a non-polar resin. In addition, the outer sheath 14 may include the same kind of resin as the insulator 112 of the insulated wire 11, or may include a different kind of resin different from the kind of resin used for the insulator 112 of the insulated wire. From a viewpoint of simplifying the configuration of the entire shielded twisted pair cable 10 and the manufacturing process, the outer sheath 14 preferably includes the same kind of resin as the insulator 112 of the insulated wire 11.

A thickness of the outer sheath 14 may be appropriately determined by taking into consideration a required protection performance or the like. For example, from a viewpoint of obtaining sufficient protection performance, the thickness of the outer sheath 14 is preferably greater than or equal to 0.2 mm. On the other hand, from a viewpoint of avoiding an excessive increase in the diameter of the shielded twisted pair cable 10, the thickness of the outer sheath 14 is preferably less than or equal to 1.0 mm. Further, although the outer sheath 14 is preferably formed of a single layer of the insulating material from a viewpoint of simplifying the configuration, the outer sheath 14 may be formed of a plurality of layers.

From a viewpoint of simplifying the configuration of the shielded twisted pair cable 10, the outer sheath 14 directly covers the outer periphery of the shield 13 located on the inner side of the outer sheath 14. However, a layer made of a material other than the material used for the outer sheath 14 may be provided between the outer sheath 14 and the shield 13 located on the inner side of the outer sheath 14. For example, in the case where the third shield 133 including the second resin tape with the metal foil is disposed at the outer surface of the shield 13 as described above, an adhesive layer may be provided on the second resin tape with the metal foil, so as to adhere the outer sheath 14 and the third shield 133 to each other. By providing the adhesive layer, the third shield 133 can be removed at the same time as when the outer sheath 14 at the end portion of the shielded twisted pair cable 10 is removed, to thereby improve a workability of the shielded twisted pair cable 10, such as removing the outer sheath 14 at the end portion of the shielded twisted pair cable 10.

(4) Wrapping Tape:

The shielded twisted pair cable 10 according to the present embodiment can also include the wrapping tape 12 that covers the outer surface of the twisted pair wire 100. The wrapping tape 12 can be formed by spirally winding a tape body around the outer periphery of the twisted pair wire 100 along the longitudinal direction of the twisted pair wire 100.

By including the wrapping tape 12 in the shielded twisted pair cable 10, it is possible to stabilize the shape and electric characteristics of the twisted pair wire 100.

A material used for the wrapping tape 12 is not particularly limited, and one or more kinds of insulating materials selected from paper, nonwoven fabric, resins, such as polyester or the like, for example, may be used for the wrapping tape 12.

The wrapping tape 12 may be formed of a single layer, or a plurality of layers, such as two or more layers.

An adhesive layer may be disposed on a surface of the wrapping tape 12 opposing the twisted pair wire 100. By disposing the adhesive layer, the wrapping tape 12 can be adhered with respect to the twisted pair wire 100, to thereby stabilize the shape of the shielded twisted pair cable 10.

Exemplary Implementations

Hereinafter, the present invention will be described with reference to specific exemplary implementations, however, the present invention is not limited to the specific exemplary implementations.

(1) Evaluation Method:

Ssd12 measurements and Ssc12 measurements were made for the shielded twisted pair cables manufactured according to the following experimental examples.

The Ssd12 is a differential mode noise radiation characteristic. The Ssc12 is a common mode noise radiation characteristic. Accordingly, in a case where the Ssd12 and the Ssc12 are less than or equal to predetermined values, it is indicated that excellent noise shielding properties are obtainable.

A length of the shielded twisted pair cable subjected to the Ssd12 measurement and the Ssc12 measurement was 3 m, and the Ssd12 and the Ssc12 were measured by a network analyzer.

(2) Conditions for Manufacturing Shielded Twisted Pair Cable:

The conditions and results of each experimental example will be described below. Experimental examples 2 through 6 are exemplary implementations, and an experimental example 1 is a comparative example.

Experimental Example EE1

The shielded twisted pair cable 10 having the cross sectional configuration illustrated in FIG. 1 was manufactured, except that the shield 13 is not included in the third shield 133.

(1) Twisted Pair Wire 100:

The two insulated wires 11 were twisted so that the twist pitch becomes 14 mm, so as to form the twisted pair wire 100.

As illustrated in Table 1, each of the two insulated wires 11 used in the twisted pair wire 100 includes the conductor 111 formed by twisting 7 conductor element wires 111A each formed by a bare soft copper wire that is not coated by a plating or the like and having an outer diameter of 0.16 mm, and the insulator 112 made of polypropylene and covering the conductor 111.

Table 1 illustrates the outer diameters of the conductor 111 and the insulator 112.

The outer diameter of the conductor 111 was evaluated by the following procedure. In an arbitrary cross section perpendicular to the longitudinal direction of the conductor 111, the outer diameter of the conductor 111 was measured by a micrometer along two orthogonal diameters of the conductor 111. Then, an average of the measured values at the two locations was defined as the outer diameter of the conductor 111. The outer diameters of the insulator 112, the conductor element wires 111A, the metal element wires 41 used for the second shield which will be described later, the outer sheath 14, or the like were measured in the same manner as the outer diameter of the conductor 111.

(2) Wrapping Tape:

A polyester tape is spirally wound on the outer surface of the twisted pair wire 100, as the wrapping tape 12. A width and a thickness of the polyester tape used for the wrapping tape 12 are as illustrated in Table 1.

(3) Shield:

The shield 13, including the first shield 131 and the second shield 132, is formed on the outer side of the twisted pair wire 100 and the wrapping tape 12.

(First Shield)

As illustrated in FIG. 3, the first shield 131 was formed by spirally winding one sheet of the first resin tape with the metal foil on the outer side of the twisted pair wire 100. The first resin tape with the metal foil used for the first shield 131 had the same cross sectional configuration as the resin tape 20 with the metal foil illustrated in FIG. 2, having the resin layer 21 made of polyester and the metal foil 22 made of aluminum foil. The resin tape with the metal foil having such a configuration may be referred to as "an Al-pasted polyester tape" in Table 1. The width and the thickness of the first resin tape with the metal foil are as illustrated in Table 1.

The resin tape 20 with the metal foil, used as the first resin tape with the metal foil, was wound around the twisted pair wire 100 so that the second surface 20B on which the resin layer 21 is disposed opposes the twisted pair wire 100, and the first surface 20A on which the metal foil 22 is disposed opposes the second shield 132.

(Second Shield)

The second shield 132 includes the braided conductor 40 described above with reference to FIG. 4. As illustrated in Table 1, the braided conductor 40 has the braided configuration in which the metal element wires 41, which are tin-plated annealed copper wires, are braided into the hollow cylindrical shape. The outer diameter of the metal element wire, and the number of units and the number of strands of the braided configuration, are as illustrated in Table 1. The second shield 132 is disposed so as to make contact with the metal foil 22 of the first resin tape with the metal foil included in first shield 131. The braid density of the second shield 132 was evaluated according to the procedure described above, and is illustrated in a column indicating the "density" in Table 1.

(Outer Sheath)

The outer sheath 14 was disposed on the outer side of the second shield 132. As illustrated in Table 1, a flame retardant halogen-free resin having a polyethylene base is used for the outer sheath 14, and the outer diameter of the outer sheath 14 is as illustrated in Table 1.

Figure 6A:
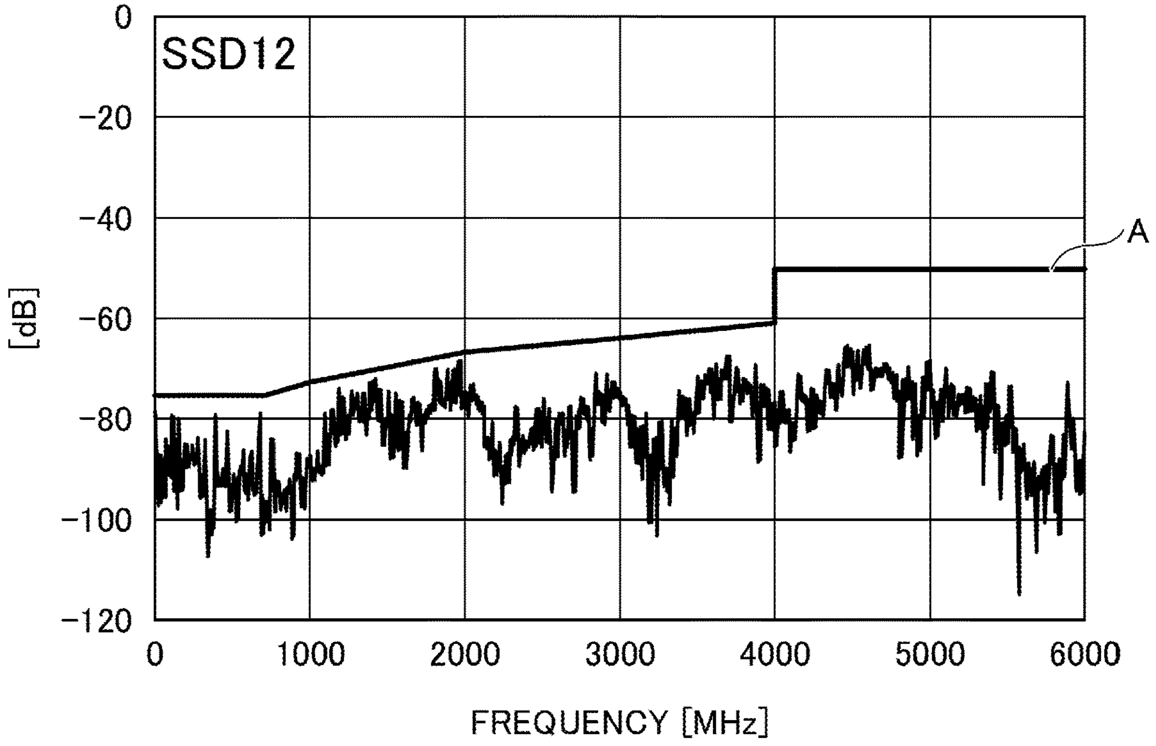
FIG. 6A is a diagram illustrating Ssd12 evaluation results of a shielded twisted pair cable according to an experimental example EE1.
Figure 6B:
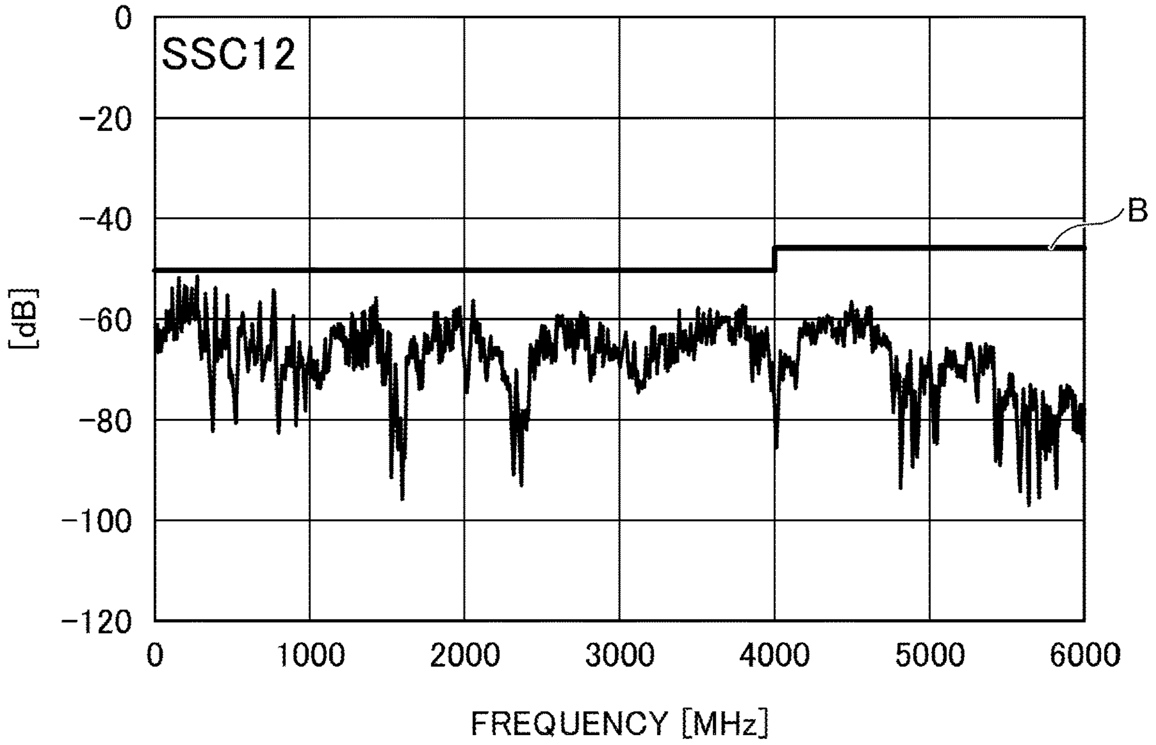
FIG. 6B is a diagram illustrating Ssc12 evaluation results of the shielded twisted pair cable according to the experimental example EE1.

The shielded twisted pair cable manufactured in the manner described above was evaluated as described above. The evaluation results are illustrated in FIG. 6A and FIG. 6B. FIG. 6A illustrates the evaluation results of the Ssd12 measurements on the shielded twisted pair cable that is manufactured, and the FIG. 6B illustrates the evaluation results of the Ssc12 measurements on the shielded twisted pair cable that is manufactured. Further, a reference line A is illustrated in FIG. 6A, and a reference line B is illustrated in FIG. 6B.

Experimental Examples EE2 Through EE6

As illustrated in Table 1 and Table 2, the shielded twisted pair cable 10 was manufactured and evaluated under the same conditions as the experimental example EE1, except that the configuration of the shield 13 of the experimental examples EE2 through EE6 is different from that of the experimental example EE1 described above.

Regarding the second shield included in the shield 13, the number of units and the number of strands of the braided configuration were set to the configuration illustrated in Table 1 and Table 2, and the braid density was set to the value illustrated in the column indicating the "density" in Table 1 and Table 2.

In addition, the shield 13 further includes the third shield 133. As illustrated in FIG. 5, the third shield 133 was formed by disposing one sheet of the second resin tape with the metal foil in the longitudinal lapping arrangement on the outer side of the second shield 132. The second resin tape with the metal foil used for the third shield 133 had the same cross sectional configuration as the resin tape 20 with the metal foil illustrated in FIG. 2, in which the resin layer 21 is made of polyester and the metal foil 22 is made of aluminum foil. A width and a thickness of the second resin tape with the metal foil are as illustrated in Table 1 and Table 2.

The resin tape 20 with the metal foil, which is used for the second resin tape with the metal foil, was wound around the twisted pair wire 100 so that the first surface 20A on which the metal foil 22 is disposed opposes the second shield 132, and the second surface 20B on which the resin layer 21 is disposed is located on the outer side.

The evaluation results are illustrated in FIG. 7A through FIG. 11B.

FIG. 7A, FIG. 8A, FIG. 9A, FIG. 10A, and FIG. 11A illustrate the evaluation results of the Ssd12 measurements on the shielded twisted pair cables manufactured in the experimental examples EE2 through EE6, respectively. Because the measured values are distributed below the reference line A in these figures, it was confirmed that sufficient noise shielding properties are obtainable.

FIG. 7B, FIG. 8B, FIG. 9B, FIG. 10B, and FIG. 11B illustrate the evaluation results of the Ssc12 measurements on the shielded twisted pair cables manufactured in the experimental examples EE2 through EE6, respectively. Because the measured values are distributed below the reference line B in these figures, it was confirmed that sufficient noise shielding properties are obtainable.

TABLE 1

| | | | | Experimental example EE1 | Experimental example EE2 | Experimental example EE3 |
|---|---|---|---|---|---|---|
| Conductor | Material | | — | Bare annealed copper | Bare annealed copper | Bare annealed copper |
| | Configuration | | conductors/mm | 7/0.16 | 7/0.16 | 7/0.16 |
| | Outer diameter | | mm | 0.48 | 0.48 | 0.48 |
| Insulator | Material | | — | Polypropylene | Polypropylene | Polypropylene |
| | Outer diameter | | mm | 1.28 | 1.28 | 1.28 |
| Twist | Pitch | | mm | 14 | 14 | 14 |
| Wrapping tape | Material | | — | Polyester tape | Polyester tape | Polyester tape |
| | Config-uration | Thickness | μm | 12 | 12 | 12 |
| | | Width | mm | 9 | 9 | 9 |
| | Winding method | | — | 1 sheet, spiral winding | 1 sheet, spiral winding | 1 sheet, spiral winding |
| First shield | Material | | — | Al-pasted polyester tape | Al-pasted polyester tape | Al-pasted polyester tape |
| | Config-uration | Thickness | μm | 15 | 15 | 15 |
| | | Width | mm | 9 | 9 | 9 |
| | Winding method | | — | 1 sheet, spiral winding | 1 sheet, spiral winding | 1 sheet, spiral winding |
| Second shield | Material | | — | Tin-plated annealed copper wire | Tin-plated annealed copper wire | Tin-plated annealed copper wire |
| | Config-uration | Number of units | units | 16 | 16 | 16 |
| | | Number of strands | strands | 9 | 9 | 7 |
| | | Outer diameter | mm | 0.08 | 0.08 | 0.08 |
| | Density | | % | 90 | 90 | 79 |
| Third shield | Material | | — | — | Al-pasted polyester tape | Al-pasted polyester tape |
| | Config-uration | Thickness | μm | — | 25 | 25 |
| | | Width | mm | — | 12 | 12 |
| | Winding method | | — | — | 1 sheet, longitudinal lapping | 1 sheet, longitudinal lapping |
| Outer sheath | Material | | — | Flame retardant halogen-free resin | Flame retardant halogen-free resin | Flame retardant halogen-free resin |
| | Thickness | | mm | 0.40 | 0.38 | 0.38 |
| | Outer diameter | | mm | 3.9 | 3.9 | 3.9 |

TABLE 2

| | | | | Experimental example EE4 | Experimental example EE5 | Experimental example EE6 |
|---|---|---|---|---|---|---|
| Conductor | Material | | — | Bare annealed copper | Bare annealed copper | Bare annealed copper |
| | Configuration | | conductors/mm | 7/0.16 | 7/0.16 | 7/0.16 |
| | Outer diameter | | mm | 0.48 | 0.48 | 0.48 |
| Insulator | Material | | — | Polypropylene | Polypropylene | Polypropylene |
| | Outer diameter | | mm | 1.28 | 1.28 | 1.28 |
| Twist | Pitch | | mm | 14 | 14 | 14 |
| Wrapping tape | Material | | — | Polyester tape | Polyester tape | Polyester tape |
| | Config-uration | Thickness | μm | 12 | 12 | 12 |
| | | Width | mm | 9 | 9 | 9 |
| | Winding method | | — | 1 sheet, spiral winding | 1 sheet, spiral winding | 1 sheet, spiral winding |

TABLE 2-continued

| | | | | Experimental example EE4 | Experimental example EE5 | Experimental example EE6 |
|---|---|---|---|---|---|---|
| First shield | Material | | — | Al-pasted polyester tape | Al-pasted polyester tape | Al-pasted polyester tape |
| | Configuration | Thickness | μm | 15 | 15 | 15 |
| | | Width | mm | 9 | 9 | 9 |
| | Winding method | | — | 1 sheet, spiral winding | 1 sheet, spiral winding | 1 sheet, spiral winding |
| Second shield | Material | | — | Tin-plated annealed copper wire | Tin-plated annealed copper wire | Tin-plated annealed copper wire |
| | Configuration | Number of units | units | 16 | 16 | 16 |
| | | Number of strands | strands | 5 | 4 | 3 |
| | | Outer diameter | mm | 0.08 | 0.08 | 0.08 |
| | Density | | % | 62 | 40 | 30 |
| Third shield | Material | | — | Al-pasted polyester tape | Al-pasted polyester tape | Al-pasted polyester tape |
| | Configuration | Thickness | μm | 25 | 25 | 25 |
| | | Width | mm | 12 | 12 | 12 |
| | Winding method | | — | 1 sheet, longitudinal lapping | 1 sheet, longitudinal lapping | 1 sheet, longitudinal lapping |
| Outer sheath | Material | | — | Flame retardant halogen-free resin | Flame retardant halogen-free resin | Flame retardant halogen-free resin |
| | Thickness | | mm | 0.38 | 0.38 | 0.38 |
| | Outer diameter | | mm | 3.9 | 3.9 | 3.9 |

Figure 7A:
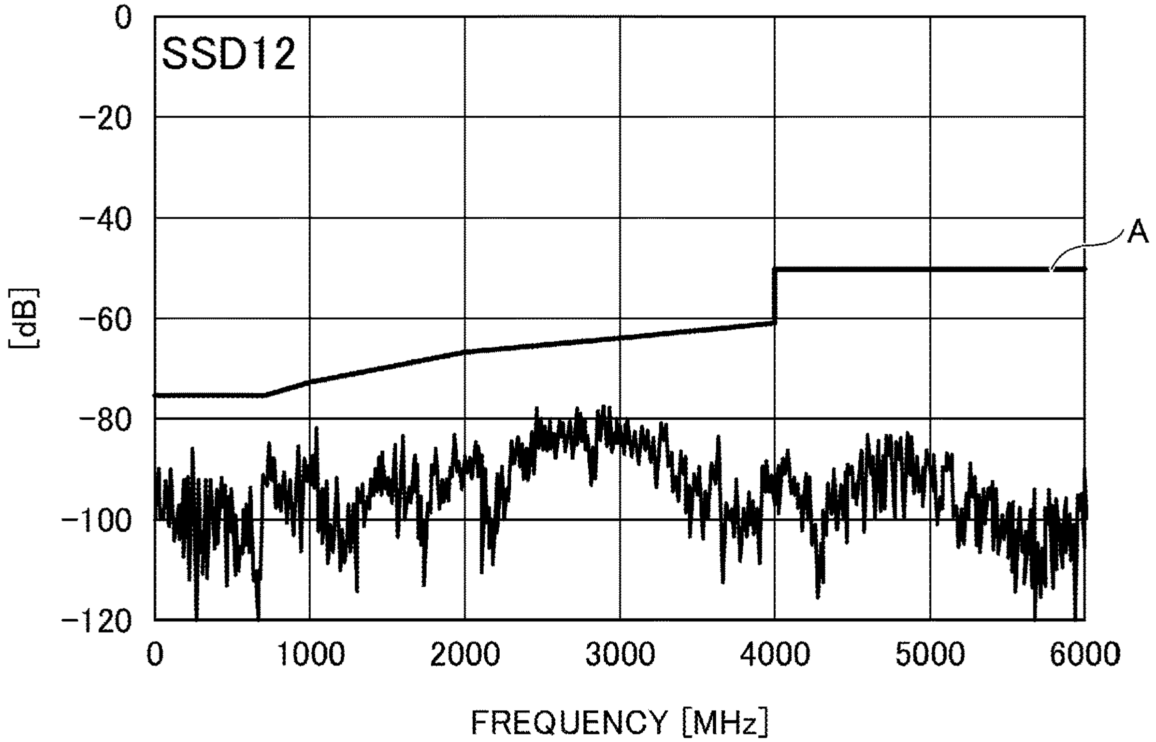
FIG. 7A is a diagram illustrating Ssd12 evaluation results of a shielded twisted pair cable according to an experimental example EE2.
Figure 7B:
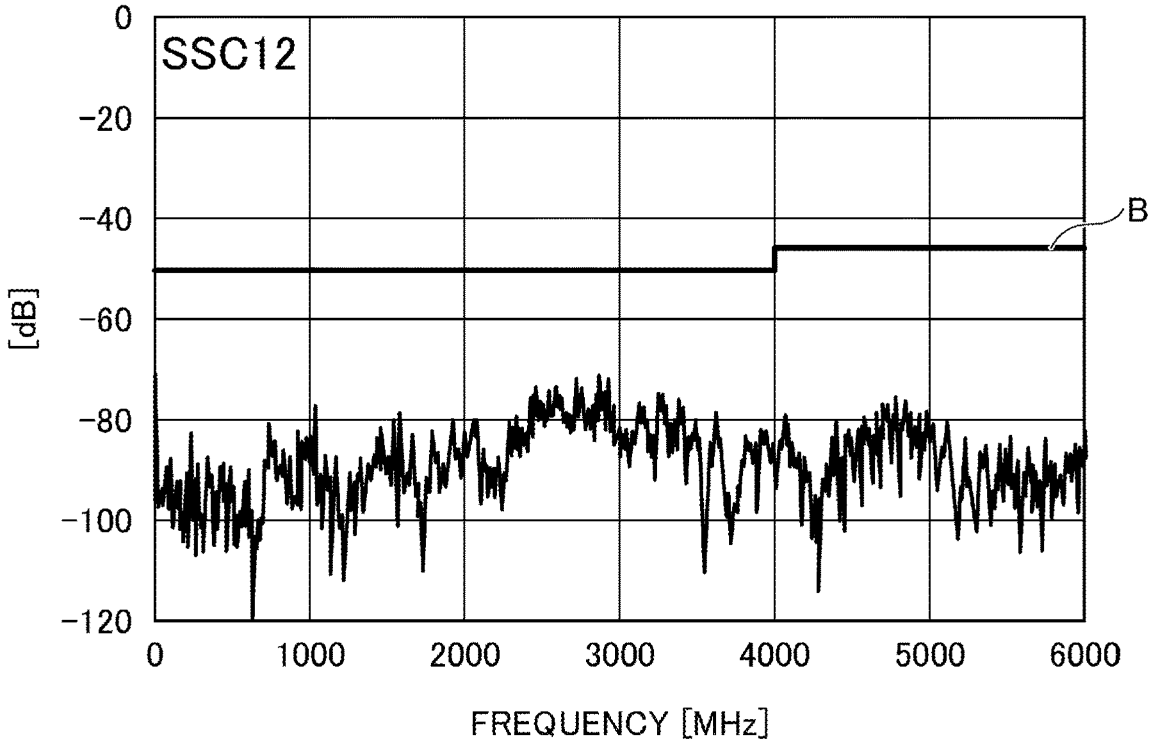
FIG. 7B is a diagram illustrating Ssc12 evaluation results of the shielded twisted pair cable according to the experimental example EE2.
Figure 8A:
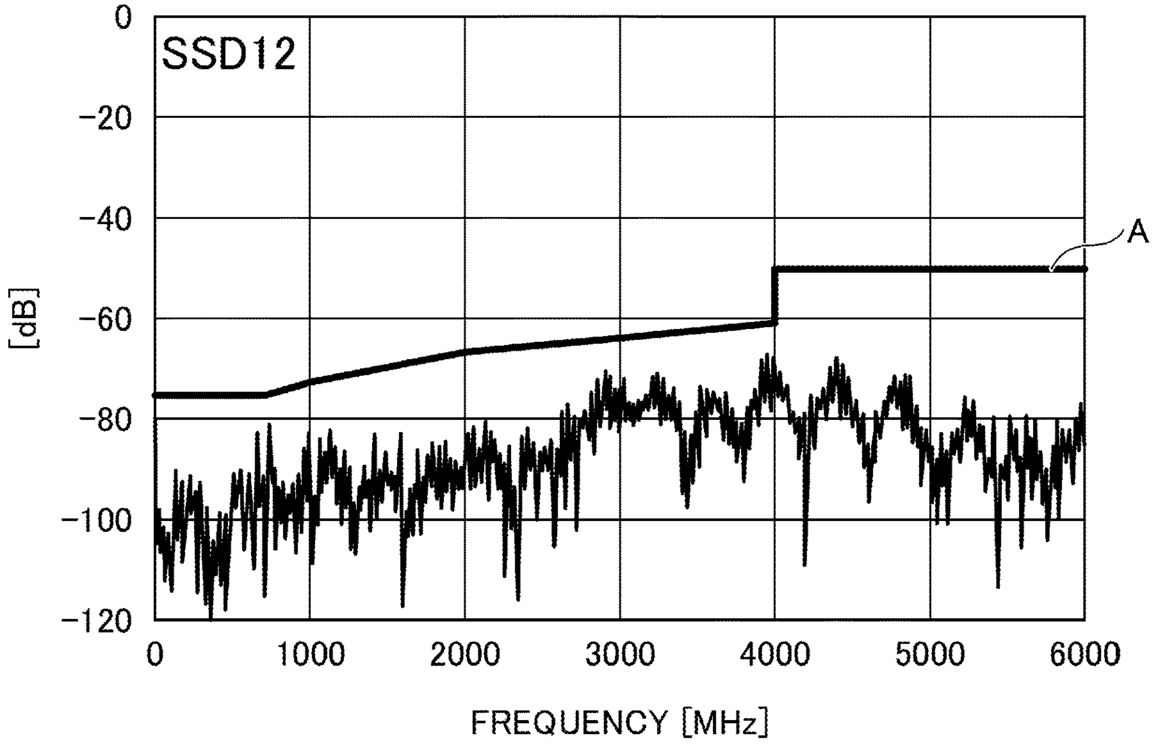
FIG. 8A is a diagram illustrating Ssd12 evaluation results of a shielded twisted pair cable according to an experimental example EE3.
Figure 8B:
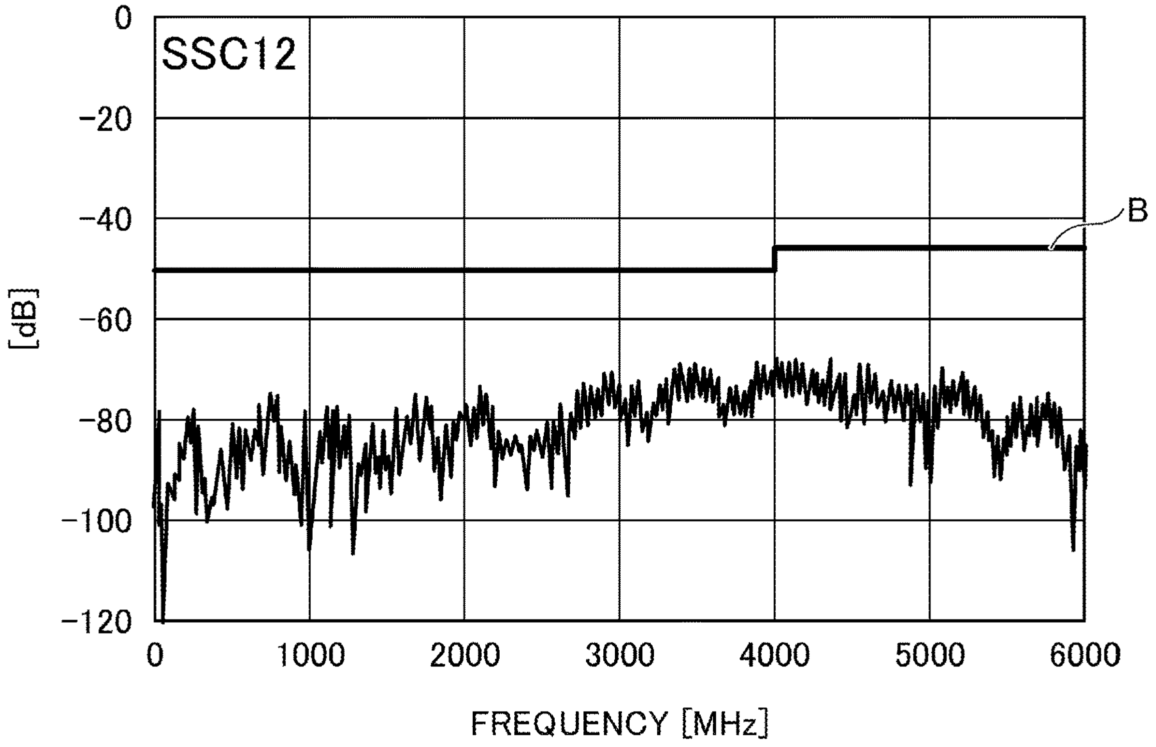
FIG. 8B is a diagram illustrating Ssc12 evaluation results of the shielded twisted pair cable according to the experimental example EE3.
Figure 9A:
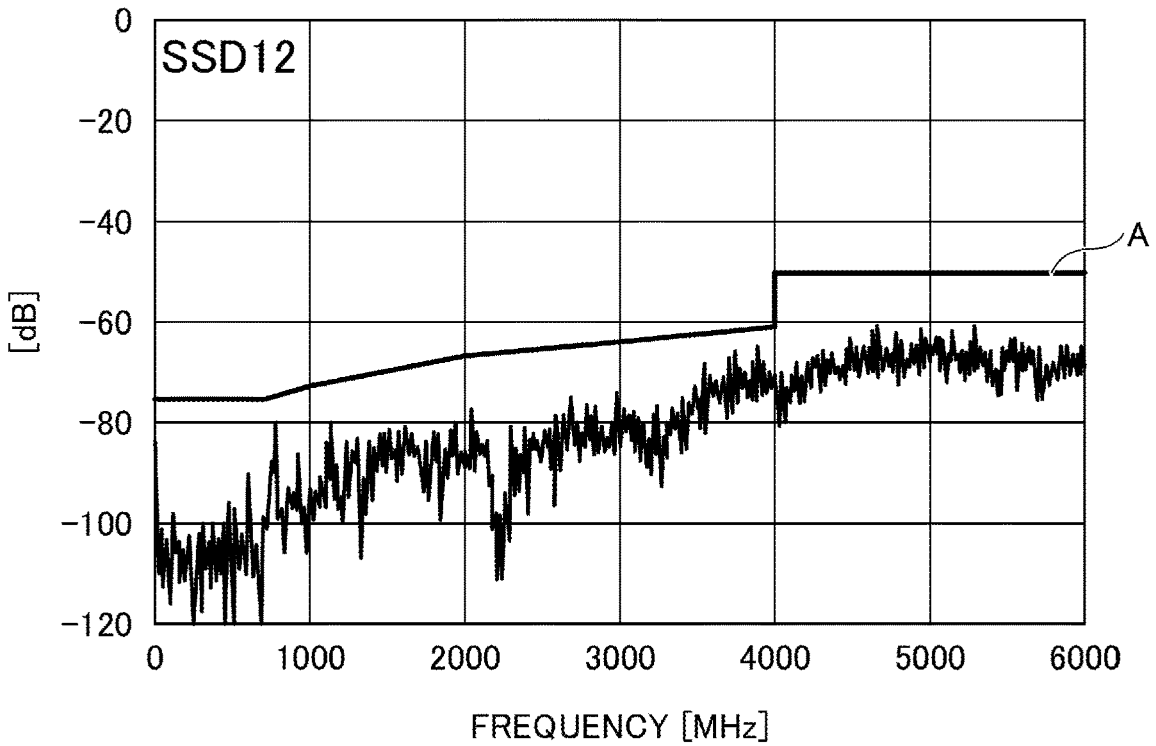
FIG. 9A is a diagram illustrating Ssd12 evaluation results of a shielded twisted pair cable according to an experimental example EE4.
Figure 9B:
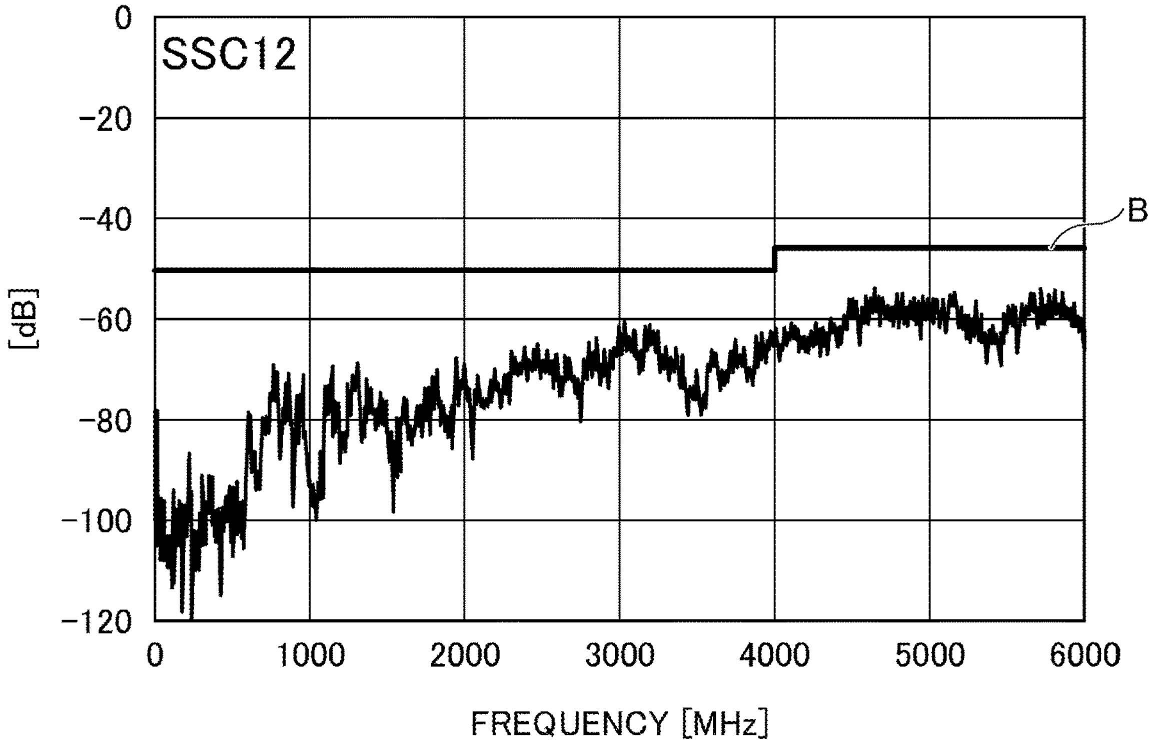
FIG. 9B is a diagram illustrating Ssc12 evaluation results of the shielded twisted pair cable according to the experimental example EE4.
Figure 10A:
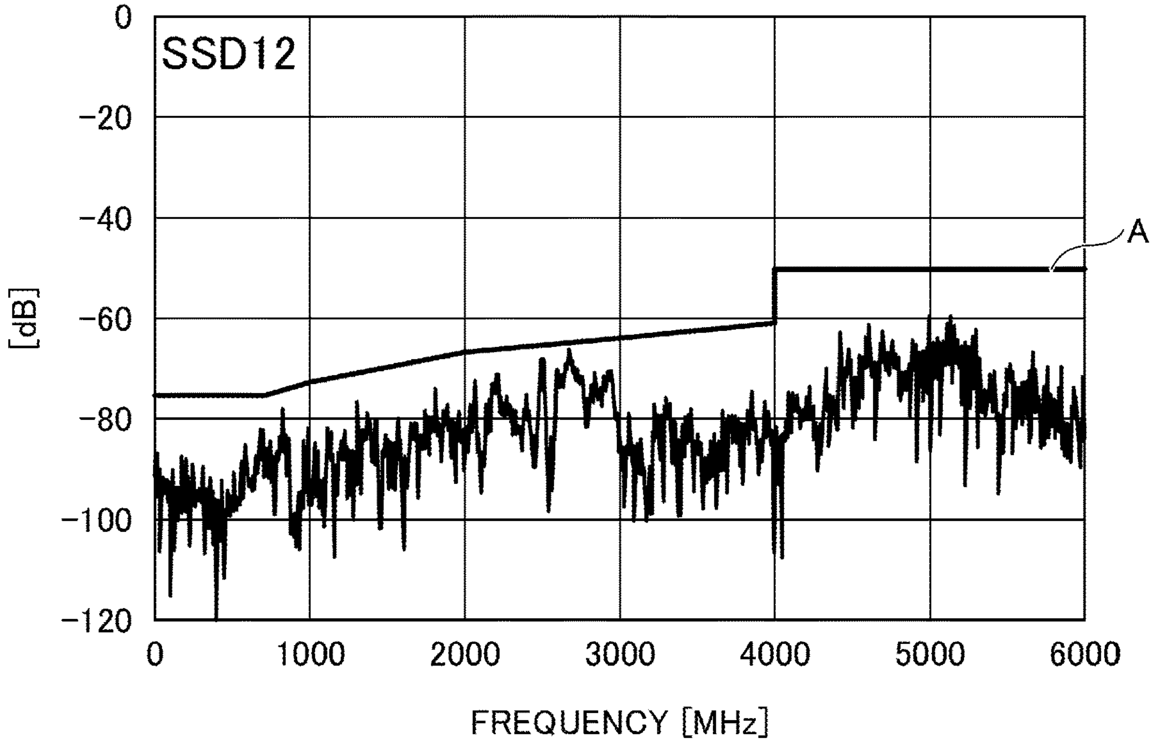
FIG. 10A is a diagram illustrating Ssd12 evaluation results of a shielded twisted pair cable according to an experimental example EE5.
Figure 10B:
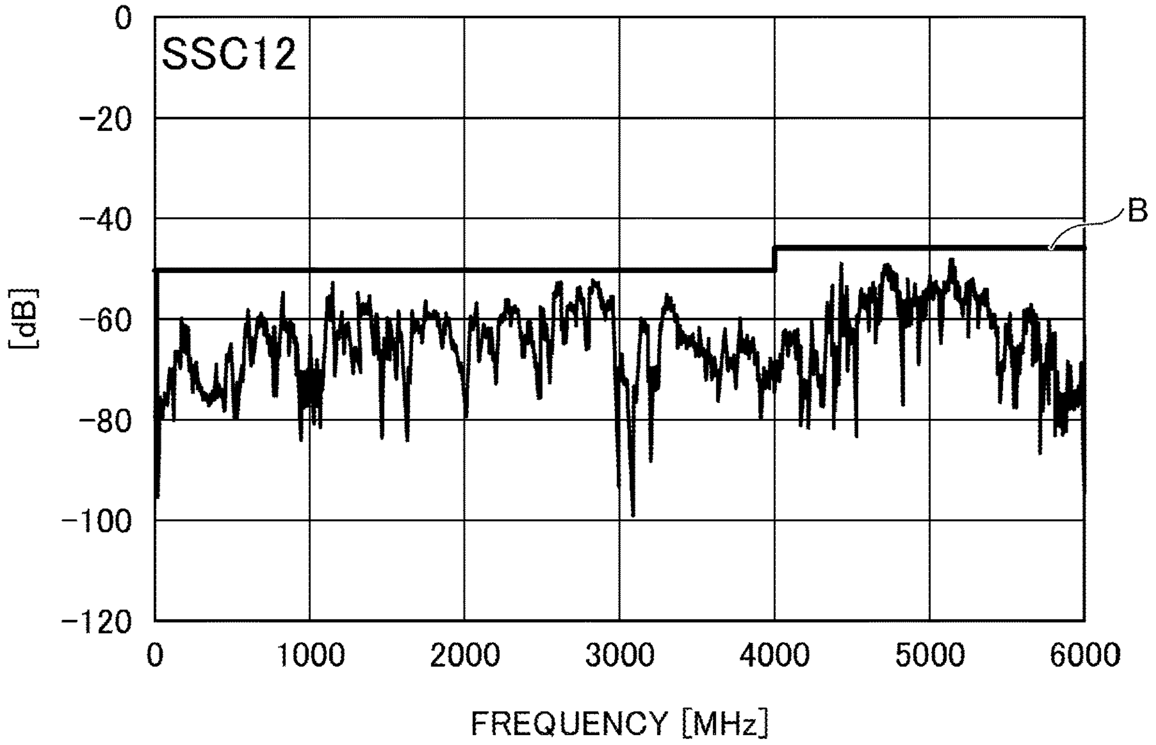
FIG. 10B is a diagram illustrating Ssc12 evaluation results of the shielded twisted pair cable according to the experimental example EE5.
Figure 11A:
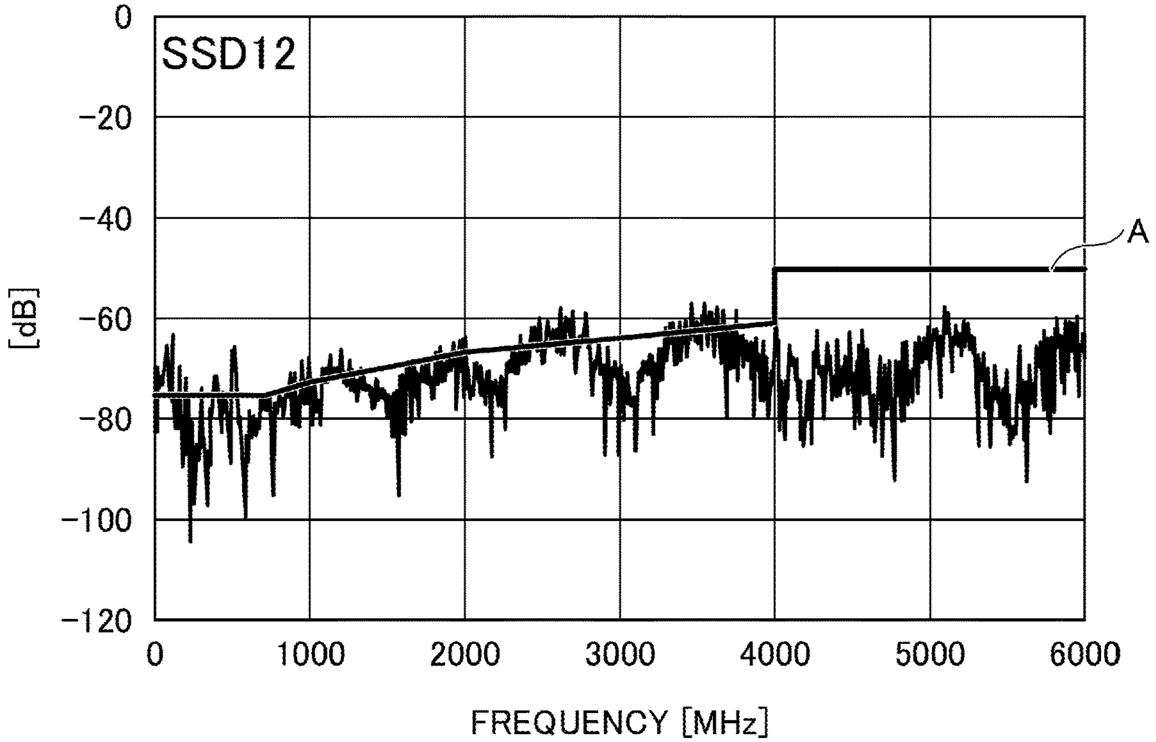
FIG. 11A is a diagram illustrating Ssd12 evaluation results of a shielded twisted pair cable according to an experimental example EE6.
Figure 11B:
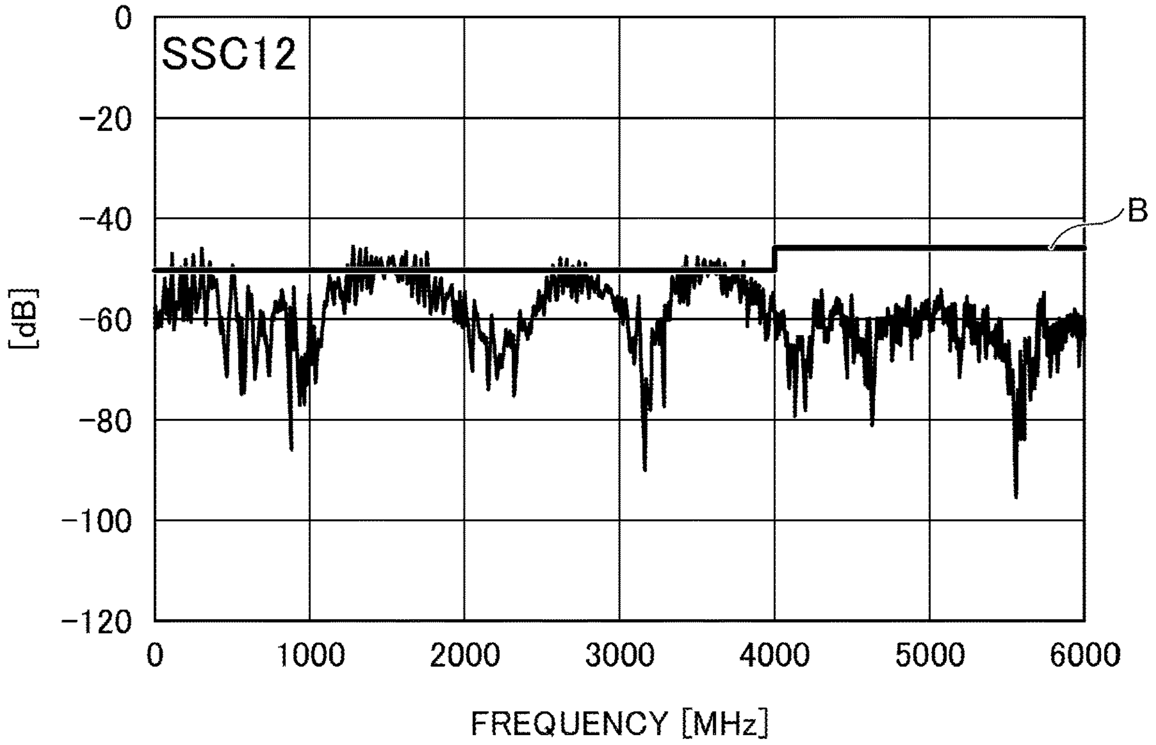
FIG. 11B is a diagram illustrating Ssc12 evaluation results of the shielded twisted pair cable according to the experimental example EE6.

When FIG. 6A and FIG. 6B, which are the evaluation results of the experimental example EE1, are compared with the FIG. 7A and FIG. 7B, which are the evaluation results of the experimental example EE2, it was confirmed that the measured values are distributed in regions more distant from the respective reference lines A and B in the experimental example EE2 having the third shield than in the experimental example EE1 not having the third shield. That is, it was confirmed that the shielded twisted pair cable of the experimental example EE2 having the third shield has excellent noise shielding properties when compared to the shielded twisted pair cable of the experimental example EE1 not having the third shield.

In addition, from the evaluation results of experimental examples EE3 through EE5, it was confirmed that by providing the third shield, the shielded twisted pair cable having excellent noise shielding properties can be obtained, even when the braid density of the braided conductor included in the second shield is lowered.

According to each of the embodiments and modifications, it is possible to provide a shielded twisted pair cable having excellent noise shielding properties.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A shielded twisted pair cable comprising:

a twisted pair wire including two insulated wires that are twisted together; and a shield configured to cover the twisted pair wire, wherein each of the two insulated wires includes a conductor, and an insulator covering the conductor, the shield includes a first shield, a second shield, and a third shield in this order from a position closest to the twisted pair wire, the first shield includes a first resin tape with a metal foil, spirally wound around the twisted pair wire, the second shield includes a braided conductor, the third shield includes a second resin tape with a metal foil, and the metal foil of the first resin tape with the metal foil makes contact with the braided conductor, and the braided conductor makes contact with the metal foil of the second resin tape with the metal foil.

2. The shielded twisted pair cable as claimed in claim 1, wherein the second resin tape with the metal foil is disposed in a longitudinal lapping arrangement.

3. The shielded twisted pair cable as claimed in claim 2, wherein a braid density of the braided conductor is greater than or equal to 40%.

4. The shielded twisted pair cable as claimed in claim 1, wherein a braid density of the braided conductor is greater than or equal to 40%.

* * * * *